United States Patent [19]

Ohmae et al.

[11] Patent Number: 5,585,437
[45] Date of Patent: Dec. 17, 1996

[54] THERMOPLASTIC RESIN COMPOSITIONS COMPRISING POLYPHENYLENE ETHER RESINS AND THERMOPLASTIC RESINS WHICH EXHIBIT IMPROVED FLOW PROPERTIES

[75] Inventors: Tadayuki Ohmae, Toyonaka; Sumio Hara, Sodegaura; Hiroomi Abe, Chiba; Kenji Nagaoka, Ichihara, all of Japan

[73] Assignee: Sumitomo Chemical Company, Limited, Osaka, Japan

[21] Appl. No.: 445,856

[22] Filed: May 22, 1995

Related U.S. Application Data

[62] Division of Ser. No. 190,468, Feb. 2, 1994, abandoned.

[30]   Foreign Application Priority Data

Feb. 5, 1993  [JP]  Japan ................................. 5-018610

[51] Int. Cl.$^6$ ............................ C08L 31/00; C08L 59/00; C08L 71/12; C08L 81/04
[52] U.S. Cl. ............................ 525/133; 525/390; 525/397
[58] Field of Search ........................... 525/133, 397, 525/390

[56]                References Cited

U.S. PATENT DOCUMENTS

| | | | |
|---|---|---|---|
| 4,957,966 | 9/1990 | Nishio et al. | 525/396 |
| 5,100,964 | 3/1992 | Yamamoto et al. | 525/57 |
| 5,162,433 | 11/1992 | Nishio et al. | 525/66 |
| 5,166,237 | 11/1992 | Abe et al. | 524/114 |
| 5,214,091 | 5/1993 | Tanaka et al. | 525/56 |
| 5,288,786 | 2/1994 | Nishio et al. | 525/397 |
| 5,304,593 | 4/1994 | Nishio et al. | 525/397 |
| 5,403,888 | 4/1995 | Nishio et al. | 525/397 |

FOREIGN PATENT DOCUMENTS 33819  6/1992  Japan .

*Primary Examiner*—Thomas Hamilton, III
*Attorney, Agent, or Firm*—Cushman Darby & Cushman IP Group of Pillsbury Madison & Sutro, LLP

[57]                 ABSTRACT

The present invention relates to a thermoplastic resin composition which comprises (C) 0.1 through 30 parts by weight of an adduct of alkylene oxide with a saponified copolymer of ethylene and vinyl ester of saturated carboxylic acid based on 100 parts by weight of a mixture of a crystalline thermoplastic resin (A) and a polyphenylene ether resin (B).

In the resin composition, the crystalline thermoplastic resin (A) forms a continuous phase and the polyphenylene ether resin (B) forms a dispersed phase.

The present invention provides a novel thermoplastic resin composition containing a polyphenylene ether resin, which has excellent flow properties, impact resistance and heat resistance.

4 Claims, No Drawings

THERMOPLASTIC RESIN COMPOSITIONS COMPRISING POLYPHENYLENE ETHER RESINS AND THERMOPLASTIC RESINS WHICH EXHIBIT IMPROVED FLOW PROPERTIES

This is a division of application No. 08/190,468, filed Feb. 2, 1994, now abandoned.

FIELD OF THE INVENTION

The present invention relates to a thermoplastic resin composition, and more specifically to a thermoplastic resin composition including a crystalline thermoplastic resin as a continuous phase and a polyphenylene ether resin as a dispersed phase to have excellent flow properties.

BACKGROUND OF THE INVENTION

A crystalline thermoplastic resin, such as polyamide, polyester and polyphenylene sulfide has several drawbacks including significant deformation in molding and insufficient heat resistance while possessing excellent mechanical properties, flow properties and oil resistance.

A non-crystalline thermoplastic resin is often blended with a crystalline thermoplastic resin to improve these drawbacks of the crystalline thermoplastic resin. A polyphenylene ether resin, which is a non-crystalline thermoplastic resin having high heat resistance, is especially appropriate to be blended with the crystalline thermoplastic resin.

A number of blended resin compositions of a crystalline thermoplastic resin and a polyphenylene ether resin have been proposed; for example, a resin composition of polyphenylene ether and polyamide disclosed in JAPANESE PATENT LAYING-OPEN GAZETTE No. Sho-56-16525. a resin composition of polyphenylene ether and polyphenylene sulfide in JAPANESE PATENT PUBLICATION GAZETTE No. Sho-56-34032, a resin composition of polyphenylene ether and polyester in JAPANESE PATENT LAYING-OPEN GAZETTE No. Sho-49-50050. and a resin composition of polyphenylene ether and polyolefin in JAPANESE PATENT LAYING-OPEN GAZETTE No. Sho-58-103557.

Such blended resin compositions have poorer flow properties than those of the compositions non-blended crystalline thermoplastic resin though the polyphenylene ether resin has compensated some of the above drawbacks that the crystalline thermoplastic resin has. Further blending of a low molecular compound for improvement in flow properties generally lowers the heat resistance and deteriorates the mechanical properties of a resultant resin composition.

SUMMARY OF THE INVENTION

The object of the present invention is thus to provide a novel resin composition having improved flow properties, maintaining small deformation in molding, excellent mechanical properties, oil resistance and heat resistance which a conventional resin composition of a crystalline thermoplastic resin and a polyphenylene ether resin originally possesses.

The inventors have intensively studied thermoplastic resin compositions including a crystalline thermoplastic resin and a polyphenylene ether resin as primary components, and found out that the addition of a specific high molecular compound as a third component to a resin composition of a crystalline thermoplastic resin and a polyphenylene ether resin specifically improves the flow properties without doing any adverse effects on the excellent properties that the resin composition originally possesses.

DETAILED DESCRIPTION OF THE INVENTION

The present invention relates to a thermoplastic resin composition which comprises (C) 0.1 through 30 parts by weight of an adduct of alkylene oxide with a saponified copolymer of ethylene and vinyl ester of saturated carboxylic acid based on 100 parts by weight of a mixture of a crystalline thermoplastic resin (A) and a polyphenylene ether resin (B), wherein said crystalline thermoplastic resin (A) forms a continuous phase and said polyphenylene ether resin (B) forms a dispersed phase.

The crystalline thermoplastic resin (A) of the present invention my be any thermoplastic resin having a crystallinity of not less than 30%. Typical examples of the crystalline thermoplastic resin (A) include polyamides such as polyamide 6, polyamide 66, polyamide 46, and polyamide 12; polyesters, such as poly(ethylene terephthalate), poly(butylene terephthalate) and poly(ethylene naphthalate): polyolefins such as polyethylene and polypropylene: polyketones such as poly(oxyphenylene carbonylphenylene oxyphenylene) and poly(oxyphenylene carbonylphenylene): polyarylene sulfides such as polyphenylene sulfide; and polyacetals such as polyoxymethylene. Among these crystalline thermoplastic resins, polyamides and polyarylene sulfide are especially preferable.

The polyphenylene ether resin (B) of the present invention is a polymer consisting of a monomer unit expressed as the formula (1) shown below.

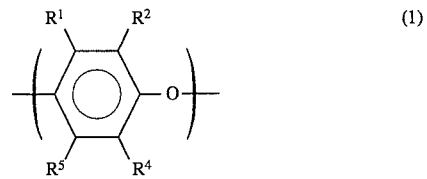

In this formula, $R^1$, $R^2$, $R^3$, and $R^4$ represent identical or different groups each selected from the group consisting of hydrogen atoms, halogen atoms, hydrocarbon groups, substituted hydrocarbon groups, hydrocarbon oxy-groups, and substituted hydrocarbon oxy-groups. Substituents of the substituted hydrocarbon groups or substituted hydrocarbon oxy-groups are thermally stable groups consisting of halogen atoms, hydroxyl groups, amino groups, nitro groups, cyano groups, carboxyl groups, amide groups, ether groups, sulfide groups, and sulfonic acid groups.

Typical examples of the polyphenylene ether resin consisting of a monomer unit expressed as the formula (1) include poly(2,6-dimethyl-1,4-phenylene ether), poly(2,6-diethyl-1,4-phenylene ether), poly(2-methyl-6-ethyl-1,4phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-butyl-1,4-phenylene ether), poly(2,6-dipropenyl-1,4-phenylene ether), poly(2,6-didodecyl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-octadecyl-oxy-1,4-phenylene ether). poly(2-methyl-6-phenyl-1,4-phenylene ether), poly(2-methyl-1,4-phenylene ether), poly(2-ethoxy-1,4-phenylene ether), poly(2-chloro-1,4-phenylene ether), poly(3-methyl-6-t-butyl-1,4- phenylene ether), poly(2,6-dichloro-1,4-phenylene ether), poly(2,5-dibromo-1,4-phenylene ether), and poly(2,6-dibenzyl-1,4-phenylene ether). The polyphenylene ether resin my be copolymers consisting of a plurality of monomer units constituting the above polymers. Such copolymers include those of multi-substituted phenols such as 2,3,6-trimethylphenol and 2,3,5,6-tetramethylphenol and 2,6-dimethylphenol.

The polyphenylene ether resin of the present invention my be graft copolymers which are graft modified above polymers or copolymers modified with a styrene monomer unit, such as styrene or α-methylstyrene.

Among these polyphenylene ether resins, poly(2,6-dimethyl-1,4-phenylene ether) and the copolymer of 2,6-dimethylphenol and 2,3,6-trimethylphenol are especially preferable.

A part of the polyphenylene ether resin my be substituted by polystyrene, if necessary.

The molecular weight of the polyphenylene ether resin of the present invention is generally expressed by the intrinsic viscosity measured in chloroform at 30° C. Although the preferable range of the molecular weight depends on its applications, it is typically in a range between 0.1 dl/g and 0.7 dl/g, and more preferably in a range from 0.2 dl/g to 0.6 dl/g. Typical methods of manufacturing such polyphenylene ether resins are disclosed, for example, in U.S. Pat. Nos. 3,306,874, 3,306,875, and 3,257,857, JAPANESE PATENT PUBLICATION GAZETTE No. Sho-52-17880. and JAPANESE PATENT LAYING-OPEN GAZETTE No. Sho-50-51197 and No. Hei-1-304119.

The adduct of alkylene oxide with a saponified copolymer of ethylene and vinyl ester of saturated carboxylic acid (C) of the present invention (hereinafter referred to as "the adduct" ) is prepared by adding alkylene oxide to the saponified copolymer of ethylene and vinyl ester of saturated carboxylic acid.

The copolymer of ethylene and vinyl ester of saturated carboxylic acid is manufactured, for example, by high-pressure radical polymerization.

The vinyl ester of saturated carboxylic acid is not limited but may be selected among a wide range of such esters. Vinyl propionate, vinyl butyrate, and especially vinyl acetate are, however, preferable.

A small quantity of alkyl ester of unsaturated carboxylic acid, for example, methyl acrylate or methyl methacrylate, may coexist in copolmerization of ethylene and vinyl ester of saturated carboxylic acid.

Neither the ethylene content nor the number average molecular weight of ethylene and vinyl ester of saturated carboxylic acid is limited to specific values. But 1 through 90 percent by weight or more specifically 40 through 80 percent by weight and 1,000 through 20,000 or more specifically 1,000 through 10,000 are preferable for the ethylene content and the number average molecular weight, respectively.

The saponification rate of the saponified copolymer of ethylene and vinyl ester of saturated carboxylic acid is not limited, but a range between 30 and 100 percent, or more specifically, a range from 50 to 100 percent is preferable.

The adduct used in the present invention my be prepared by any appropriate method. In an exemplified method disclosed in JAPANESE PATENT LAYING-OPEN GAZETTE No. Hei-3-227307, a 2-phase heterogeneous mixture of an aliphatic alcohol and a molten copolymer of ethylene and vinyl ester of saturated carboxylic acid is partially or completely saponified in the presence of an alkali catalyst while an alkyl ester of saturated carboxylic acid as a byproduct is removed from the reaction system. The remaining aliphatic alcohol is then removed from the reaction system. Then, if necessary, after further addition of the alkali catalyst, alkylene oxide is added to the saponified mixture.

The alkylene oxide used here is not limited but may be selected among a wide range of oxides. Propylene oxide, butylene oxide, and especially ethylene oxide are, however, preferable. The alkylene oxide may be block or random adduct of one or a plurality of such oxides.

The amount of alkylene oxide added to the saponified copolymer of ethylene and vinyl ester of saturated carboxylic acid is not limited to specific values, but the preferable range is 20 through 1,000 parts by weight, or more specifically, 50 through 500 parts by weight with respect to 100 parts by weight of the saponified copolymer.

In the thermoplastic resin composition of the present invention, the crystalline thermoplastic resin (A) forms a continuous phase and the polyphenylene ether resin (B) form a dispersed phase.

Such morphology realizes the resin composition having excellent properties.

In the resin composition of the present invention, the average particle diameter of the dispersed phase is not greater than 20 micrometer, preferably not greater than 10 micrometer, and more specifically not greater than 5 micrometer.

The mixing ratio of the crystalline thermoplastic resin (A) to the polyphenylene ether resin (B) my be varied in any desirable range, provided that the former forms a continuous phase and the latter forms a dispersed phase.

The preferable range is 75 through 1 parts by weight of the polyphenylene ether resin (B) with respect to 25 through 99 parts by weight of the crystalline thermoplastic resin (A).

More specifically, 65 through 10 parts by weight of the polyphenylene ether resin (B) is preferable with respect to 35 through 90 parts by weight of the crystalline thermoplastic resin (A).

The amount of the adduct (C) is 0.1 through 30 parts by weight, or preferably 1 through 15 parts by weight, with respect to 100 parts by weight of a mixture of the crystalline thermoplastic resin (A) and the polyphenylene ether resin (B). The smaller quantity of the adduct (C) than 0.1 parts by weight can not sufficiently improve the flow properties whereas the quantity greater than 30 parts by weight softens the resultant resin composition to give the insufficient mechanical strength.

Such resin composition is prepared by using a compatibilizing agent (D) to improve the compatibility of the crystalline thermoplastic resin and the polyphenylene ether as disclosed in JAPANESE PATENT LAYING-OPEN GAZETTE No. Sho-63-183954, which is incorporated herein by this reference.

Examples of the compatibilizing agent (D) include compounds containing, in molecule, at least one of carboxyl group, acid hydride group, acid amide group, imide group, carboxylate group, epoxy group, amino group, isocyanate group, oxazoline ring-containing group and hydroxyl group.

Among said compounds, maleic anhydride maleic acid, fumaric acid, itaconic acid, glycidyl acrylate, glycidyl methacrylate, allylglycidyl ether and polyisocyanates are preferable.

In the present invention, said term "polyisocyanates" means organic compounds having at least two isocyanate groups and/or isothiocyanate groups in one molecule.

The resin composition of the invention my further include a filler (E), if necessary. Typical examples of the filler include inorganic fibers, such as glass fibers, potassium titanate fibers, rock wool and carbon fibers: organic fibers, such as aromatic polyamide fibers and polybenzimidazol fibers: metal fibers, such as stainless steel fibers, brass fibers and aluminum zinc fibers; inorganic particles, such as glass beads, asbestos, wollastonite, mica, talc, clay, calcium carbonate, magnesiumhydroxide, silica and diatomaceous earth; metal particles, such as aluminum flakes and zinc flakes; and organic particles such as polyimide powder. Among these fillers, glass fibers are especially preferable.

The amount of the filler (E) is not greater than 200 parts by weight, or more preferably not greater than 150 parts by weight with respect to 100 parts by weight of the mixture of the crystalline thermoplastic resin (A) and the polyphenylene ether resin (B).

The resin composition of the present invention my be manufactured by any known method, such as solution blending or melt-kneading, but the melt-kneading method is especially preferable. In this method, the components of the resin composition are blended with a conventional mixing unit, for example, a Henschel mixer, a super mixer, a ribbon blender, or a V-blender, used for mixing resins or a resin with a liquid or solid additive. After being made sufficiently homogeneous, the mixture is melt-kneaded with a known melt-kneading machine, for example, a Banbury mixer, a Plastomill, a Brabender Plastograph, a single screw or twin screw extruder.

The melt-kneading temperature is in a range between 150° and 400° C. and more preferably in a range from 200° to 350° C.

The resin composition of the present invention my further include an elastomer, a flame-retardant, a stabilizer, a plasticizer, a lubricant, or the like.

Typical examples of the elastomer include polybutadiene rubber, polyisoprene rubber, butyl rubber, ethylene-propylene copolymer rubber, ethylene-propylene-non-conjugated diene terpolymer rubber, butadiene-styrene copolymer rubber, butadiene-acrylonitrile copolymer rubber, hydrogenated or non-hydrogenated styrene-conjugated diene block copolymer rubber, polyester rubber, acrylic rubber, silicone rubber, and modifications of such rubbers.

Among these elastomers, preferable choices are ethylene-propylene copolymer rubber, ethylene-propylene-non-conjugated diene terpolymer rubber; and styrene-conjugated diene block copolymer rubber, such as partially-hydrogenated or non-hydrogenated styrene-isoprene diblock copolymer and styrene-butadiene triblock copolymer.

Typical examples of the flame-retardant include a number of phosphates, such as triphenyl phosphate, tricresyl phosphate, phosphate prepared from a mixture of isopropyl phenol and phenol, and phosphates prepared from mixtures of two-functional phenols like benzohydroquinone or bisphenol A and other alcohols or phenols; bromine compounds, such as decabromobiphenyl, pentabromtoluene, decabromodiphenyl ether, hexabrombenzene, polystyrene bromide and brominated epoxy resin; and nitrogen-containing compounds, such as melamine and melamine triisocyanate.

Examples of the stabilizer include steric-hindrance phenols, organic phosphates, oxalic diazidos, and steric-hindrance amines.

The lubricant my be, for example, polyethylene wax or paraffin.

The amounts of these additional elements are determined according to the utility of the present resin composition.

Preferably, the elastomer is not greater than 100 parts by weight, the fire-retardant is not greater than parts by weight or more preferably in a range between 1 and 20 parts by weight, the stabilizer is not greater than 20 parts by weight or more preferably in a range between 0.001 and 10 parts by weight, and the lubricant is not greater than 2 parts by weight, with respect to the total of 100 parts by weight of the crystalline thermoplastic resin (A) and the polyphenyl ether resin The thermoplastic resin composition of the present invention my be applicable to a variety of casings, frames, connectors, switches, and other mechanical elements in electric, electronic and office automation apparatuses; magnet flywheels, sideview mirror stays, lamp reflectors, cylinder head covers, and a variety of gears in automobiles and vehicles; and a variety of housings, pulleys, and steering wheels in machines.

EXAMPLES

The features of the present invention will be described more in detail according to the Examples, which are only illustrative and not restrictive in any sense. In the Examples and Comparative Examples below, the following abbreviations are used:

PPE1: Poly(2,6-dimethyl-1,4-phenylene ether) having the intrinsic viscosity of 0.46 dl/g measured in chlorofom at 30° C.;

PPE2: Poly(2,6-dimethyl-1,4-phenylene ether) having the intrinsic viscosity of 0.30 dl/g measured in chlorofom at 30° C.;

PA: Polyamide-6 (Sold under the trade name of CAPRON XPN-1546 by Allied Signal Co., Ltd.);

PPS: Crosslinked polyphenylene sulfide (Sold under the trade name of Liton M3910 by Toray PPS Co., Ltd. );

SBS: Styrene-butadiene-styrene triblock copolymer (Sold under the trade name of CARIFLEX TR1101 by Shell Chemical Co., Ltd.);

FIL: Equal-weight mixture of glass fibers (diameter: 10 micrometer; length: 3 mm) and calcium carbonate (diameter: 2 micrometer);

MAH: Maleic anhydride as a compatibilizing agent;

cMDI: Polymethylene polyphenyl polyisocyanate as a compatibilizing agent (Sold under the trade tone of SUMIJULE 44V20 by Sumitomo Bayer Urethane Co., Ltd.): and CPO: Component (C) prepared in the Reference Example described below.

The mean particle diameter of the polyphenylene ether resin (PPE) forming a dispersed phase in the thermoplastic resin composition was determined in the following manner. Each sample of the resin composition ms prepared through trimming, etching with chloroform, and gold deposition. After the actual particle diameters of PPE were measured in a scanning electron microscopic photograph of each sample, the mean particle diameter ms determined according to the formula (2) expressed as:

$$\text{Mean Particle Diameter of } PPE = (di^4 \times ni)/(di^3 \times ni); \quad (2)$$

wherein di represents the particle diameter measured and ni shows the number of particles having the diameter di.

The notched Izod impact strength (NI) and the heat distortion temperature (HI)T) under a loading of 18.6 kg/cm2 were measured for samples of 3.2 mm and 6.4 mm in thickness according to ASTM D256 and D648.

The melt flow rate (MFR) was measured under a loading of 2.16 kg/cm2 in accordance with JIS K7210.

Reference Example

The adduct used in the invention was manufactured in the following manner.

(1) Preparation of an ethylene-vinyl acetate copolymer

An ethylene and a vinyl acetate were copolymerized in a high-pressure reactor at a pressure of 1,400 kg/cm² and a temperature of 190 ° C. in the presence of tert-butyl peroxy-2-ethyl hexanoate as a radical initiator and propane as a molecular weight modifier. Thus obtained was an ethylene-vinyl acetate copolymer (hereinafter referred to as EVA), where the vinyl acetate content was 31 percent by weight, the number average molecular weight was 1,800, and the softening point was 30 ° C.

(2) Preparation of the adduct of alkylene oxide with a saponified ethylene-vinyl acetate copolymer In a stainless steel autoclave of 700 l in volume with an agitator, a run-off line and a feed line, 160 kg of EVA prepared as above, 320 kg of methyl alcohol and 0.96 kg of sodium hydroxide were sufficiently mixed and stirred at a temperature of 65 ° C. for two hours while the run-off line was open. The temperature was gradually raised to 142° C. over one hour, so that all the volatile substances were removed from the autoclave.

Thus obtained saponified EVA was wax like having the melting point of 83° C. and the saponification rate of 90%.

After 0.27 kg of potassium hydroxide ms added to the saponified EVA obtained as above and the temperature of the autoclave was raised to 180° C., ethylene oxide was added until the pressure in the autoclave became equal to 2 kg/cm². Since the pressure in the autoclave was lowered through addition reaction of ethylene oxide, feeding of ethylene oxide ms intermittently conducted to maintain the pressure at 2 kg/cm². The total of 272 kg ethylene oxide was added over one hour. When the pressure was dropped to 0.4 kg/cm², the temperature was lowered to 100 ° C. and a product was taken out of the autoclave. Thus obtained was 408kg of the adduct of alkylene oxide with saponified EVA (hereinafter referred to as CPO) having the melting point of 51 ° C. and the hydroxyl value of 110 mg KOH/g.

CPO also contained 1,200 ppm sodium and 300 ppm potassium as alkali metals.

Examples 1, 2 and Comparative Example 1 through 3

Thermoplastic resin compositions of Examples 1,2 and Comparative Examples 1 through 3 were prepared according to formulations shown in Tables 1 and 2 by the melt-kneading method. Various properties of the resin compositions obtained were tested: Table 3 shows the results of the tests.

TABLE 2

| Examples/Comparative Examples (Comp. Ex.) | Formulation (2) | | | |
|---|---|---|---|---|
| | Compatibilizing agents (D) | | Additives | |
| | Components | Parts by weight | Components | Parts by weight |
| Example 1 | MAH | 0.45 | SBS | 10 |
| Comp. Ex. 1 | MAH | 0.45 | SBS | 10 |
| Comp. Ex. 2 | MAH | 0.45 | SBS | 10 |
| Example 2 | cMDI | 2 | FIL | 150 |
| Comp. Ex. 3 | cMDI | 2 | FIL | 150 |

TABLE 3

| Examples/Comparative Examples (Comp. Ex.) | Properties | | | |
|---|---|---|---|---|
| | Mean particle diameter of PPE | NI kg. cm/cm | HDT °C. | MFR g/10 minutes |
| Example 1 | 0.8 | 12 | 117 | 5.1 *1 |
| Comp. Ex. 1 | 0.7 | 12 | 111 | 2.7 *1 |
| Comp. Ex. 2 | Continuous phase | 5.0 | 165 | 0.5 *1 |
| Example 2 | 1.3 | 4.0 | 226 | 15 *2 |
| Comp. Ex. 3 | 1.5 | 4.2 | 223 | 3.0 *2 |

*1: Measurement temperature: 280° C.
*2: Measurement temperature: 300° C.

Effect of the Invention

The resin composition of the present invention thus prepared has excellent properties including flow properties as well as heat resistance and impact resistance, and is desirably molded or formed by extrusion molding, injection molding, or blow molding to be favorably applied to a wide range of industrial fields.

What is claimed is:

1. A thermoplastic resin composition which comprises (C) 1 through 15 parts by weight of an adduct of alkylene oxide with a saponified copolymer of ethylene and a vinyl ester of a saturated carboxylic acid based on 100 parts by weight of a mixture of 25–99 parts by weight of a crystalline thermoplastic resin (A) which is at least one selected from the group consisting of polyesters, polyolefins, polyarylene sulfides and polyacetals, and a 75–1 parts by weight of polyphenylene ether resin (B), wherein said crystalline thermoplastic resin (A) forms a continuous phase and said polyphenylene ether resin (B) forms a dispersed phase.

TABLE 1

| Examples/Comparative Examples (Comp. Ex.) | Formulation (1) | | | | | |
|---|---|---|---|---|---|---|
| | Crystalline thermoplastic resin (A) | | Polyphenylene ether (B) | | The adduct (C) | |
| | Components | Parts by weight | Components | Parts by weight | Components | Parts by weight |
| Example 1 | PA | 45 | PPE1 | 45 | CPO | 5 |
| Comp. Ex. 1 | PA | 45 | PPE1 | 45 | — | — |
| Comp. Ex. 2 | PA | 20 | PPE1 | 70 | CPO | 5 |
| Example 2 | PPS | 60 | PPE2 | 40 | CPO | 3 |
| Comp. Ex. 3 | PPS | 60 | PPE2 | 40 | — | — |

2. A thermoplastic resin composition according to claim 1, wherein said crystalline thermoplastic resin (A) contains polyarylene sulfide.

3. A thermoplastic resin composition according to claim 2, wherein said polyarylene sulfide is polyphenylene sulfide.

4. A thermoplastic resin composition according to claim 1, wherein said thermoplastic resin (A) is at least one member selected from the group consisting of polyesters, polyolefins, and polyacetals.

* * * * *